United States Patent
Ferreira et al.

(10) Patent No.: US 8,078,343 B2
(45) Date of Patent: Dec. 13, 2011

(54) VIRTUAL CONTROL PANEL FOR AERONAUTICS ATTITUDE REFERENCE UNITS

(75) Inventors: Thierry Ferreira, Saint Medard En Jalles (FR); Sylvie Loizeau, Pessac (FR)

(73) Assignee: Thales (FR)

( * ) Notice: Subject to any disclaimer, the term of this patent is extended or adjusted under 35 U.S.C. 154(b) by 456 days.

(21) Appl. No.: 12/275,483

(22) Filed: Nov. 21, 2008

(65) Prior Publication Data

US 2009/0138143 A1    May 28, 2009

(30) Foreign Application Priority Data

Nov. 23, 2007 (FR) ...................... 07 08216

(51) Int. Cl.
*G05D 1/08* (2006.01)
*G08B 23/00* (2006.01)

(52) U.S. Cl. .......................... 701/4; 340/967
(58) Field of Classification Search .................. 701/3, 4, 701/14
See application file for complete search history.

(56) References Cited

U.S. PATENT DOCUMENTS

| 4,283,705 A | 8/1981 | James et al. |
| 2003/0193411 A1 * | 10/2003 | Price ............................ 340/973 |
| 2005/0125141 A1 | 6/2005 | Bye |
| 2005/0150289 A1 * | 7/2005 | Osborne ..................... 73/178 R |
| 2005/0192747 A1 * | 9/2005 | Schiller et al. ................ 701/220 |
| 2006/0080004 A1 | 4/2006 | Cheok et al. |

FOREIGN PATENT DOCUMENTS

GB    1480652    7/1977

* cited by examiner

*Primary Examiner* — Tuan C To
*Assistant Examiner* — Imran Mustafa
(74) *Attorney, Agent, or Firm* — Lowe Hauptman Ham & Berner, LLP

(57) ABSTRACT

The general field of the invention relates to devices for controlling the two attitude reference units of the AHRS type for aircraft, each AHRS comprising at least a first set of magnetometer measurements and at least a second set of gyroscopic measurements, each AHRS having two modes of operation, the first mode, called slave mode supplying the flight system with the information coming from the first set, the second mode, called DG mode supplying the flight system with the information coming from the second set. The device according to the invention comprises a display and means for displaying within this display a control window for these two attitude reference units, said window comprising three regions, the first region dedicated to the first AHRS unit, the second region dedicated to the second AHRS unit, the third region dedicated to the simultaneous control of the two AHRS units.

3 Claims, 2 Drawing Sheets

VIRTUAL CONTROL PANEL FOR AERONAUTICS ATTITUDE REFERENCE UNITS

RELATED APPLICATIONS

The present application is based on, and claims priority from, French Application Number 07 08216, filed Nov. 23, 2007, the disclosure of which is hereby incorporated by reference herein in its entirety.

BACKGROUND OF THE INVENTION

1. Field of the Invention

The field of the invention is that of onboard equipment for aircraft and its control. In the field of aeronautics and, in particular, in the field of helicopters, the weight of onboard equipment is a critical factor insofar as it conditions the performance of the aircraft. Airplane and helicopter operators are therefore very sensitive to the gains in weight and volume that are able to be made on avionics equipment. These gains allow the useful load of the carrier, and hence its commercial value, to be increased.

2. Description of the Prior Art

The continued objective of avionics designers is therefore to design avionics systems with a high degree of integration in order to reduce the weight and the overall size without degrading the safety and security of operation and the functional and operational capacities of the equipment proposed.

The present invention relates to the control of a unit of equipment called "AHRS", an acronym signifying "Attitude and Heading Reference System". The function of the AHRS is to supply the attitude and heading parameters to the display screens and to the automatic pilot. Conventionally, the AHRS incorporates three gyroscopes, three accelerometers and also a magnetic compass. The magnetic compass supplies the heading of the carrier. The gyroscopes and the accelerometers supply the attitude parameters. In its normal mode of operation, the AHRS uses the magnetometer to supply the heading information. This mode of the AHRS is referred to as "SLAVE" mode: in other words, it is feedback controlled onto the magnetic compass. However, close to the earth's poles or near to sources of interference such as oil rigs, the magnetic heading is virtually useless since it is severely affected by the earth's magnetic field. In this case, the AHRS has a mode known as "DG", for "Directional Gyro", in which the AHRS calculates a heading, no longer based on the magnetic sensor but on an integration function of the gyroscopic accelerations. In order to use this mode correctly, the pilot has to manually input a heading which will be used as an initialization value for the integration calculation of the measurements coming from the gyroscopes of the AHRS.

In the same way, in the case of loss of the magnetometer sensor, the pilot can manually select the DG mode of the AHRS in order to have available the heading information supplied by the gyroscopes, once initialized by the pilot. In order to select the AHRS mode (DG or SLAVE) or to allow the pilot to correct the DG heading, the AHRS manufacturers offer dedicated control panels. Since the civil regulations impose a redundancy on this primary sensor, two AHRS units are disposed in the aircraft and two control panels are installed, dedicated to each AHRS. These two panels generate extra weight and take up space in the central part of the cockpit.

In order to gain in weight, some helicopter operators replace these control panels by buttons or control knobs directly installed in the cockpit. In this case, a gain in weight is achieved but the problem of cockpit congestion still remains.

Beyond the problems of congestion and performance, ergonomic issues associated with the existing mechanical interfaces still remain. The heading correction is still applied by means of a control knob which, depending on the direction in which the pilot turns it and depending on the amount of rotation he applies to it, supplies the AHRS, rather than with the raw value of initialization heading, with the rate at which the AHRS must modify the latest heading used. This rate can vary from 2 degrees/second to 8 degrees/second as a general rule. When the correction to be applied is significant, the action of the pilot will therefore be lengthy and necessarily iterative.

SUMMARY OF THE INVENTION

The device according to the invention consists in eliminating the "AHRS" control units or the physical buttons in order to replace them with a device comprising a single "virtual control panel" controlled by a man-machine interface and allowing the two AHRS to be controlled either separately or simultaneously. The equipment is therefore no longer controlled by physical control panels but via a single window displayed on the display screens. This window features, in addition to the functions provided by the conventional control panels, new and original functions such as, for example, the simultaneous control of both AHRS units. The control of the window is carried out via an interactive media of the computer mouse type or "CCD" for "Cursor Control Device" type which comprises a man-machine interface based on a "track ball", a "touch pad" or a "joystick". One of the major advantages of this solution is that the means required by the device according to the invention are already installed in the aircraft for controlling the selection of the pages displayed on the display screens. The advantages of this solution are manifold:

The weight of the avionics is considerably reduced by the elimination of control units;

The cockpit is emptied of all panels or buttons that complicate the use of the flight instrument and control panel. Training times, risks of error, etc. are thus reduced.

Since the congestion of the cockpit is limited, it becomes possible to install larger display screens or other computer equipment.

More precisely, the subject of the invention is a device for controlling two attitude reference units of the AHRS type for aircraft, each AHRS comprising at least a first set of magnetometer measurements and at least a second set of gyroscopic measurements, each AHRS having two modes of operation, the first mode, called "slave" mode, supplying the flight system with the information coming from the first set, the second mode, called "DG" mode, supplying the flight system with the information coming from the second set, said device comprising at least one man-machine interface, at least one display device, connection means between, on the one hand, the man-machine interface and the display device and, on the other, the display device and the AHRS units, characterized in that the display device comprises means for displaying a window for controlling the two attitude reference units, said window comprising three regions, the first region dedicated to the first AHRS unit, the second region dedicated to the second AHRS unit, the third region dedicated to the simultaneous control of the two AHRS units.

Advantageously, the first set of symbols presented in the first region and the second set of symbols presented in the second region comprise:

Representations of means for selecting the first or the second mode of operation of the first or of the second AHRS;

A representation of the value of the magnetic heading of the aircraft;

A representation of the difference in heading existing between the heading indication supplied by the first set of magnetometer measurements and the heading indication supplied by the second set of gyroscopic measurements;

and the third set of symbols presented in the third region comprises a representation of means for simultaneous selection on the two AHRS of one of the two types of mode.

Advantageously, the representation of the value of the magnetic heading of the aircraft is different in "slave" mode from the representation of the value of the magnetic heading of the aircraft in "DG" mode.

Advantageously, in mode "DG", the representation of the value of the magnetic heading, when the AHRS supplies a measurement equal to the displayed value, is different from the representation of the value of the magnetic heading when the AHRS supplies a measurement different from the displayed value.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

MORE DETAILED DESCRIPTION

Figure 1:
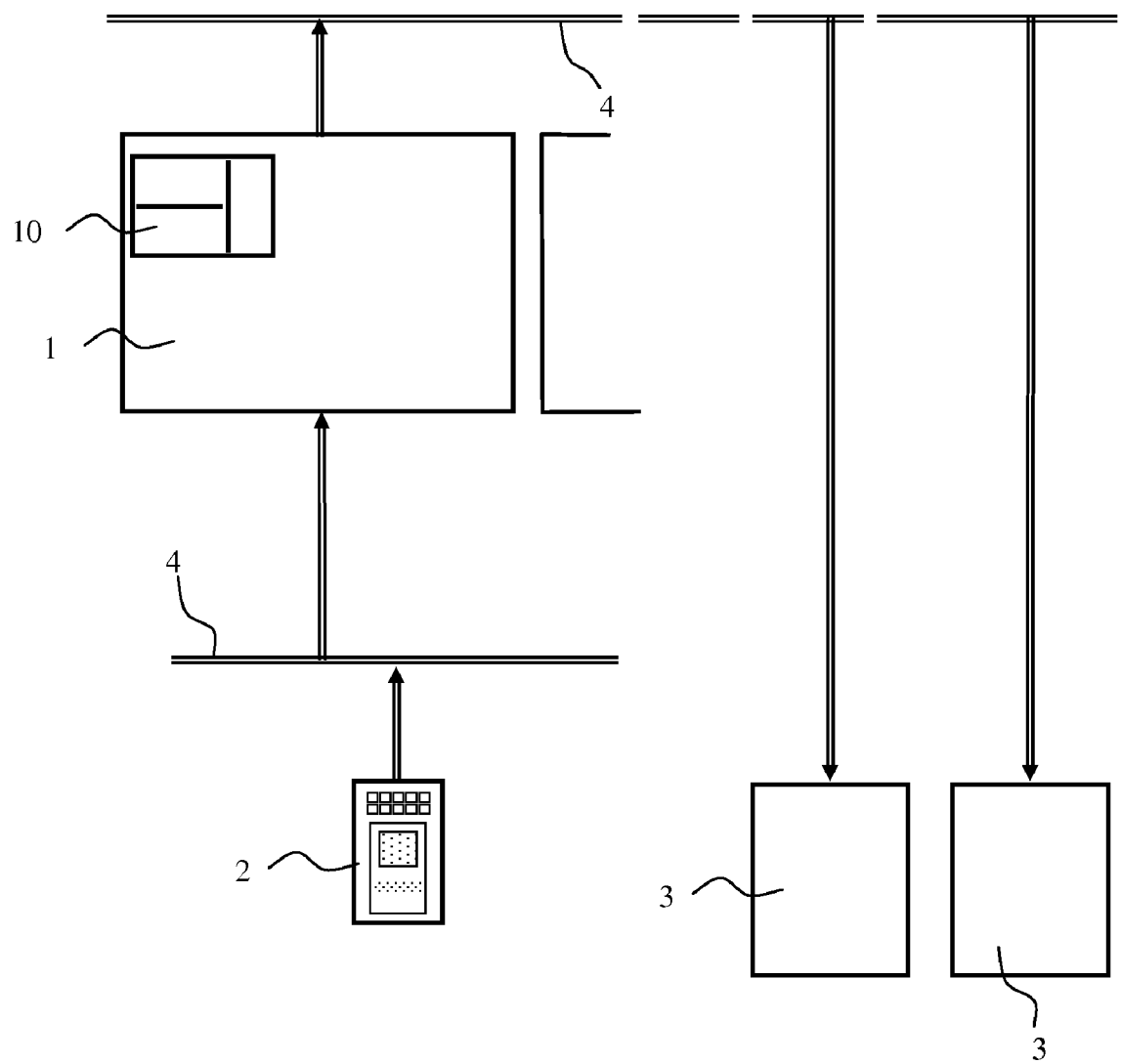
FIG. 1 shows the general schematic of the part of the flight system comprising the AHRS and a control device according to the invention.

FIG. 1 shows the general schematic of the part of the flight system comprising the two AHRS 3 and a control device according to the invention. More precisely, the system comprises at least one display 1 comprising means for displaying a control window 10 for the two attitude reference units. This display is linked via a computer connection bus 4:

on the one hand, to a man-machine interface 2 of the computer mouse or else CCD, for "Cursor Control Device", type which, by means of a computer cursor, allows the displayed information to be displayed, modified or set;

on the other hand, to the two onboard "AHRS" units 3.

Figure 2:
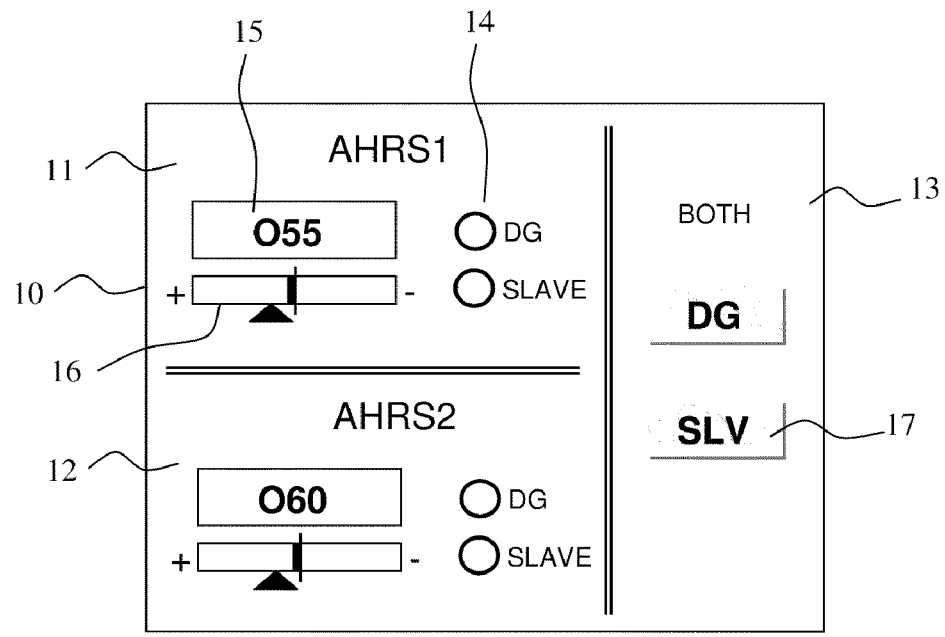
FIGS. 2 and 3 show a view of the window for controlling the two AHRS in two different configurations according to the invention.
Figure 3:
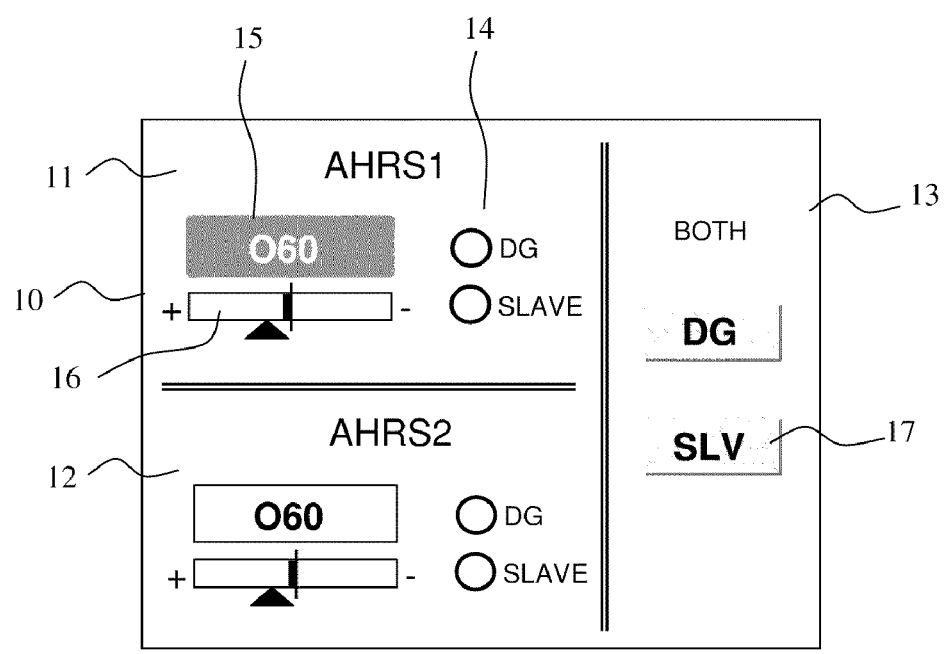

As indicated in FIGS. 2 and 3, the displayed window 10 comprises three regions, the first region 11 in the top left of FIGS. 2 and 3 dedicated to the first AHRS unit, the second region 12 in the bottom left of FIGS. 2 and 3 dedicated to the second AHRS unit, the third region 13 on the right-hand side of FIGS. 2 and 3 dedicated to the simultaneous control of the two AHRS units. It is of course possible to modify this configuration according to the carrier, to the specifications of the aircraft operator, to particular features of the AHRS units, etc.

The first set of symbols presented in the first region and the second set of symbols presented in the second region each comprise:

Representations of means for selecting the first or the second mode of operation of the AHRS 3. These are two circular indicators 14 marked "DG" and "SLAVE" in FIGS. 2 and 3. The activation of the indicators corresponds to a change of color. Other forms of indicators are of course possible;

A representation 15 of the value of the magnetic heading of the aircraft. This representation can be the value of the heading inscribed in a rectangle. This value is equal to 055 in FIG. 2 and 060 in FIG. 3. In this case, it becomes possible to change either the color of the value of the heading, or the color of the rectangle surrounding it;

A representation 16 of the difference in heading existing between the heading indication supplied by the first set of magnetometer measurements and the heading indication supplied by the second set of gyroscopic measurements. This difference is symbolized in FIGS. 2 and 3 by a cursor in the shape of a black triangle sliding under a bar disposed under the representation of the value of the heading 15. Other representations are equally possible so as to provide the same function;

The third set of symbols presented in the third region comprises a representation of means for simultaneously selecting on the two AHRS one of the two types of mode. It is represented by two grayed buttons denoted DG and SLV in FIGS. 2 and 3.

In the device according to the invention, the method which consists in correcting a magnetic heading is as follows:

In normal mode called SLAVE, the current heading is displayed in green, in order to indicate that the heading value to be displayed is the current value. The heading correction function is not therefore available in this case. This case is represented in FIG. 2 where the two indicators "SLAVE" are shown grayed, symbolizing that they are lit and that, accordingly, the mode "SLAVE" is chosen for the two AHRS.

When the DG mode is selected, for example on the AHRS1 thanks to the interactive CCD, the current heading is displayed, for example, in cyan since it becomes modifiable by the pilot. This selected DG state is represented by a grayed indicator in FIG. 3.

After selection via the interactive CCD as shown in FIG. 3, the selected state is differentiated from the unselected state, for example by changing the background color of the rectangle surrounding the value of the heading in order to warn the pilot that the information is being updated. The background color displayed is preferably cyan. In this case, the value of the heading is displayed in inverse video mode so as to distinguish it from the color of the background. The heading can then be modified, for example, by means of a track ball or control knob of the CCD. This modified heading is periodically sent to the AHRS in order for the latter to take into account, in real time, the information selected by the pilot and to reproduce it on the primary display screens.

After inputting the chosen value by hitting the "enter" key of the interactive CCD, the color of the background returns to normal video mode and the heading information goes back to cyan, since its value is still modifiable, the DG mode still being selected, even if the pilot is no longer in edit mode.

In the case where the value returned by the AHRS is different from the value selected by the pilot, the heading selection is displayed, for example, in amber in order to warn the pilot that an operational inconsistency has been detected.

A bar disposed underneath the heading indication allows the heading error to be displayed, namely the difference between the magnetic heading and the gyroscopic heading.

From a functional point of view, this virtual control panel offers the same functions that may currently be offered by mechanical interfaces. It also offers the following additional functions:

The pilot can switch one or the other of the AHRS into DG or SLAVE mode by a simple click on his interactive media, but can also switch both AHRS simultaneously into DG or SLAVE mode, which the current mechanical interfaces do not allow. Thus, close to the poles, which is where the two AHRS see their magnetic heading affected, the pilot can switch the AHRS into DG mode with a single action. However, in the case of a failure of the magnetic compass on one of the two AHRS, the pilot can switch this AHRS into DG mode, while at the same time keeping the other AHRS in SLAVE mode in order to maintain a good level of precision on the AHRS operating correctly.

The control interface of the AHRS allows the desired heading value to be input directly. Indeed, the selection of the initialization heading is effected by means of a track ball or a numerical keyboard with display of the selected value on the control panel, which allows the desired heading value to be input more quickly and without iteration.

The definition of the virtual interface incorporates checks on the information returned by the AHRS, a feature not offered by a mechanical interface. Indeed, in the case of mechanical interfaces, if the AHRS does not receive the correction information correctly or quite simply, if the AHRS takes longer to correct the heading information, the pilot may not notice because no error message reaches the pilot. By means of the virtual interface according to the invention, in the case where the heading value returned by the AHRS is not the same as that selected by the pilot, the color of the value selected by the pilot can be of a different color to that usually displayed in order to warn him.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. A device for controlling two attitude reference units of the AHRS type for aircraft, each AHRS comprising at least a first set of magnetometer measurements and at least a second set of gyroscopic measurements, each AHRS having two modes of operation, the first mode, called "slave" mode, supplying the flight system with the information coming from the first set, the second mode, called "DG" mode, supplying the flight system with the information coming from the second set, said device comprising at least one man-machine interface,
at least one display device,
connection means for connecting the man-machine interface and the display device, and the display device and the AHRS units,
wherein
the display device comprises means for displaying a window for controlling the two attitude reference units,
said window comprises three regions, the first region dedicated to the first AHRS unit, the second region dedicated to the second AHRS unit, the third region dedicated to the simultaneous control of the two AHRS units,
the first set of symbols presented in the first region and the second set of symbols presented in the second region comprise:
  representations means for selecting the first or the second mode of operation of the first or of the second AHRS;
  a representation of the value of the magnetic heading of the aircraft; and
  a representation of the difference in heading existing between the heading indication supplied by the first set and the heading indication supplied by the second set; and
the third set of symbols presented in the third region comprises representation means for simultaneous selection on the two AHRS of one of the two types of mode.

2. The control device as claimed in claim 1, wherein the representation of the value of the magnetic heading of the aircraft is different in "slave" mode from the representation of the value of the magnetic heading of the aircraft in "DG" mode.

3. The control device as claimed in claim 2, wherein, in "DG" mode, the representation of the value of the magnetic heading when the AHRS supplies a measurement equal to the displayed value is different from the representation of the value of the magnetic heading when the AHRS supplies a measurement different from the displayed value.

* * * * *